Jan. 5, 1932. A. U. WETHERBEE 1,839,516
BOILER
Filed Dec. 30, 1927 6 Sheets-Sheet 1

Jan. 5, 1932.  A. U. WETHERBEE  1,839,516
BOILER
Filed Dec. 30, 1927  6 Sheets-Sheet 2
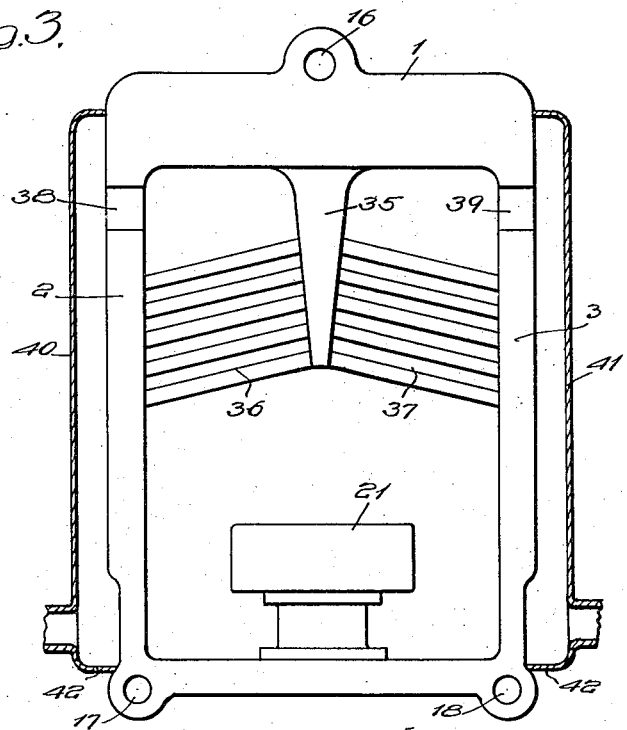
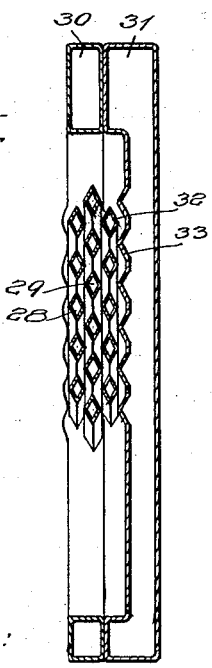
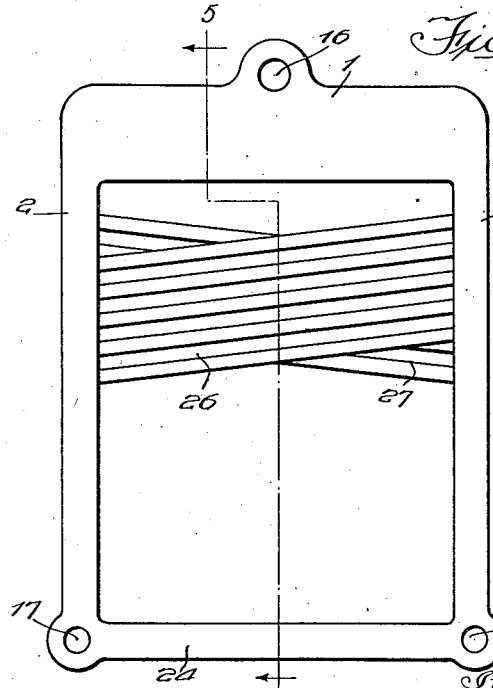

Jan. 5, 1932. A. U. WETHERBEE 1,839,516
BOILER
Filed Dec. 30, 1927 6 Sheets-Sheet 3
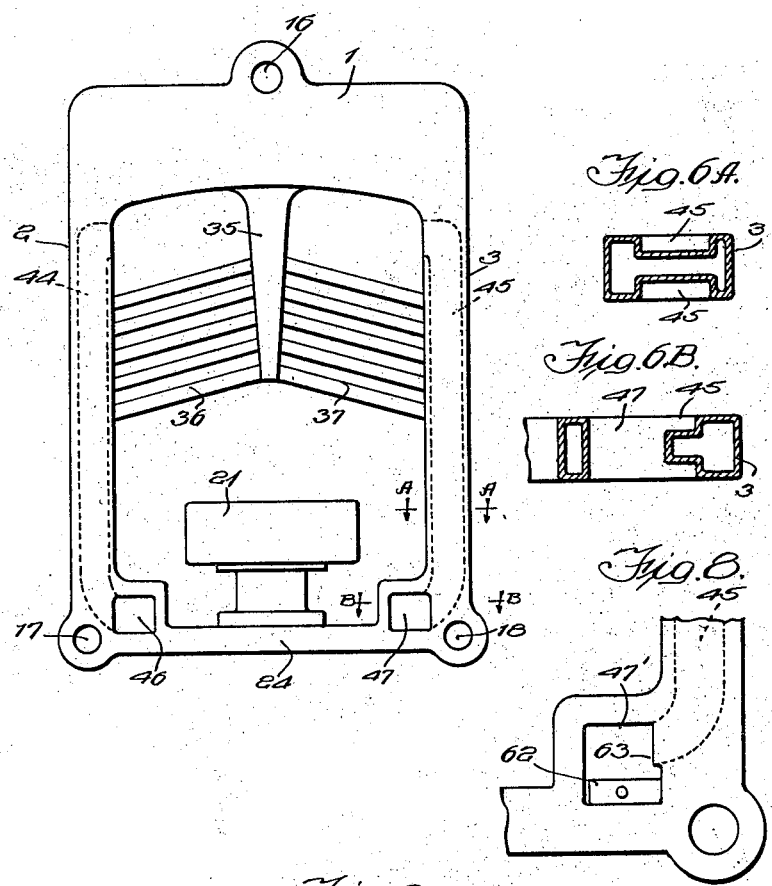
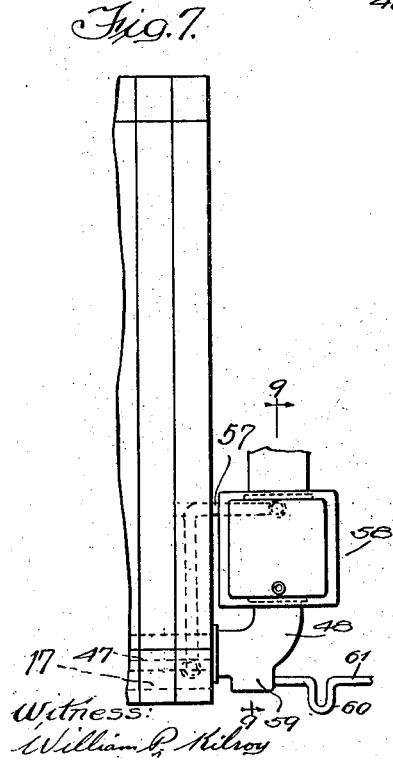
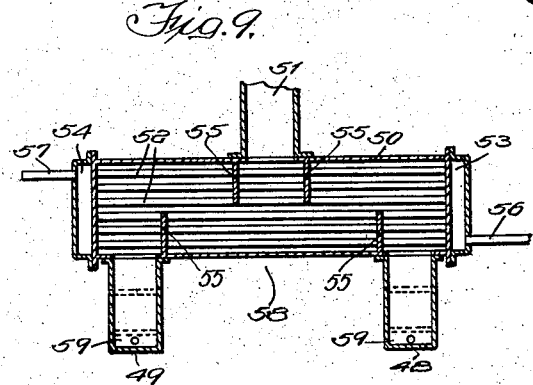
Inventor:
Ashur U. Wetherbee Jan. 5, 1932.　　A. U. WETHERBEE　　1,839,516
BOILER
Filed Dec. 30, 1927　　6 Sheets-Sheet 4

Jan. 5, 1932.  A. U. WETHERBEE  1,839,516
BOILER
Filed Dec. 30, 1927  6 Sheets-Sheet 5

Witness:
William P. Kilroy

Inventor:
Ashur U. Wetherbee
By Brown, Boettcher & Dienner
Attys

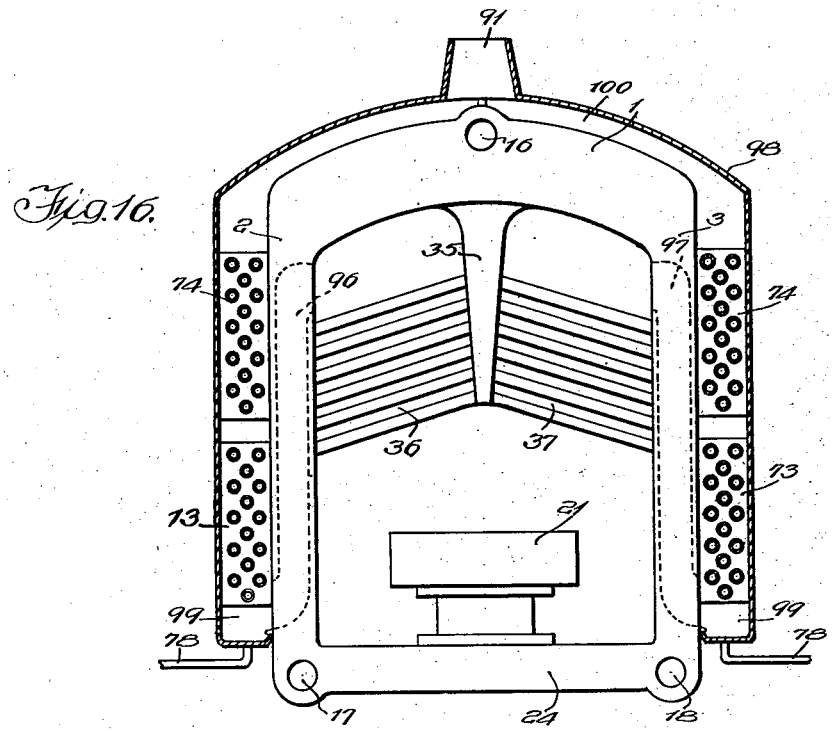
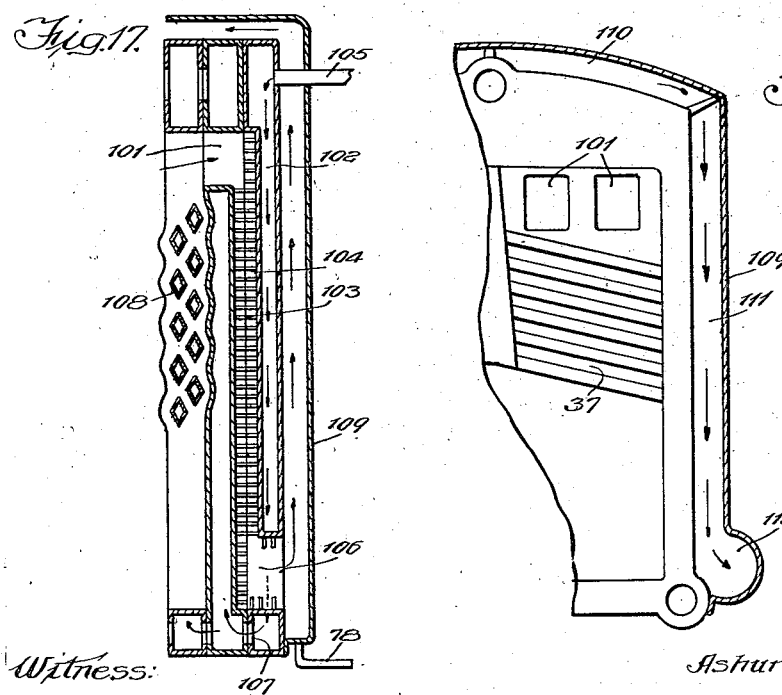

Patented Jan. 5, 1932

1,839,516

UNITED STATES PATENT OFFICE

ASHUR U. WETHERBEE, OF EVANSTON, ILLINOIS, ASSIGNOR TO AUTOGAS CORPORATION, OF CHICAGO, ILLINOIS, A CORPORATION OF DELAWARE

BOILER

Application filed December 30, 1927. Serial No. 243,525.

My invention relates to cast iron heating boilers for house heating and the like. The invention is not, however, to be limited to this specific application or use, nor to the cast iron type of heaters, since certain features of the invention are applicable, generally, to boilers.

I have developed for use in house heating service a gas burner of high efficiency, as disclosed in my co-pending application, Serial No. 207,399, filed July 21, 1927. The use of gas as a heating fuel requires high efficiency of combustion and heat transfer because of the relatively high cost of this fuel. The same requirement prevails in respect to the use of oil fuel.

It is desirable that the boiler, that is, the medium that transfers the heat of the burning fuel to the working fluid, be designed and constructed to take full advantage of this economy of combustion.

I find that the employment of gas or oil as a fuel results in the formation of a relatively large amount of water vapor because of the high hydrogen content of such fuels. This water vapor is formed in the course of combustion and appears as a part of the products of combustion. Its formation cannot be prevented, but its presence is objectionable for two reasons. First, it carries a relatively large heat content. The specific heat of water vapor, as compared to carbon dioxide or other gaseous products of combustion, is relatively high. Next, the chilling of the water vapor produces a condensate, that is, water, and this tends to rust and corrode the metal parts with which it comes into contact. The tendency to condense is greater as the products of combustion approach the flue outlet or stack outlet, and hence the liquid tends to form at the top of the flue or stack and run down the inside of the stack or chimney, and it may discolor the plaster, the wall paper and the like.

According to the present invention, I provide suitable means for precipitating by condensation the water vapor in the flue gases. This not only removes it so that the plaster, wall paper, etc. will be saved from damage, but also it recovers the latent heat of vaporization which would otherwise be lost or dissipated.

According to one mode of operation, I provide a chilling surface at the outlet of the furnace or boiler casing which precipitates, by condensation, the outgoing water vapor. This chilling surface takes up the latent heat of vaporization of the water vapor and transmits it to a stream of water which carries the heat either back into the boiler circuit or into some useful channel. I may chill this surface by the incoming air for supporting combustion and thus utilize the heat recovered through the medium of the fire. In either event the recovered heat is usefully applied to the working fluid.

Also in one embodiment of the invention, the products of combustion, after being thus subjected to chilling, are again reheated or warmed so as to prevent further condensation and also to improve the draft of the flue, that is, the upward gravity displacement of the gases of combustion.

For the purpose of securing high efficiency of heat transfer within the boiler and to provide the same at relatively low cost, I provide cast iron sections which form the external portion of the boiler and dispose in said sections wrought metal tubes suitably expanded into openings in the cast metal walls. These tubes may be crossed to provide an efficient zone of heat transfer and to equalize the draft effect.

Other means for efficiently utilizing the heat of the products of combustion are disclosed in special passageways for the same along the surfaces of the boiler.

Now in order to acquaint those skilled in the art with the manner of constructing and operating a device embodying my invention, I shall describe in connection with the accompanying drawings a specific embodiment of the same.

In the drawings:—

Fig. 3 is a front elevational view of a boiler section of modified form showing the sheet metal cover plate in section;

Fig. 4 is a front elevational view of a modified form of boiler section having crossed cast tubes;

Fig. 5 is a cross sectional view taken on the line 5—5 of the section shown in Fig. 4 and an end section adjacent thereto;

Fig. 6 is a front elevational view of a modified form of section in which the gas passages are disposed in the side walls of the section;

Figure 6A is a section taken substantially on line A—A Figure 6;

Figure 6B is a section taken substantially on line B—B Figure 6.

Fig. 7 is a side elevational view of the end sections of a boiler, showing the water vapor condenser in end elevation;

Fig. 8 is a fragmentary elevational view of a modified form of flue passage embodying a pan for trapping the condensate which may be formed within the boiler;

Fig. 9 is a vertical section through the water vapor condenser taken on the line 9—9 of Fig. 7;

Fig. 16 is a vertical transverse section through a boiler embodying my invention showing gas passages through the water legs of the boiler and vapor condensers along the side;

Fig. 17 is a vertical section through a portion of the boiler showing the vapor condenser and gas reheater in modified form; and Fig. 18 is a view taken at right angles to Fig. 17 showing the casing in section illustrating the gas outlet for products of combustion along the bottom of the casing.

Figure 1:
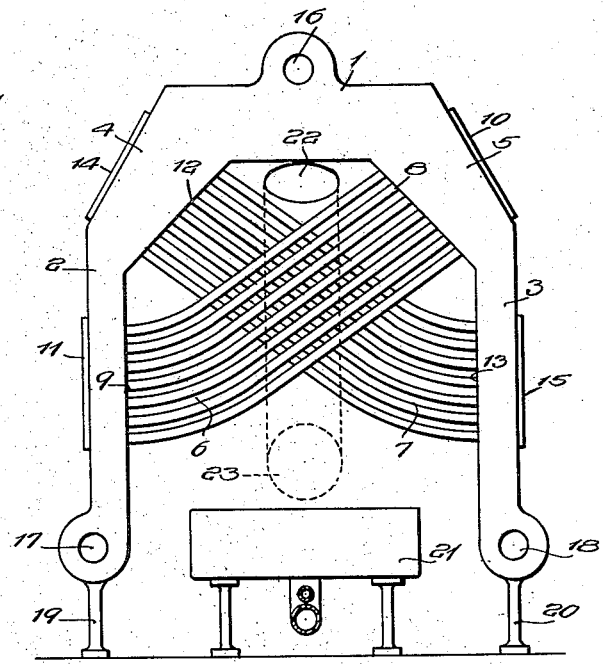
Fig. 1 is a front elevational view of a boiler section showing the location of the burner.

Referring first to Fig. 1, I have shown a simple form of boiler construction in which cast iron sections are provided to build up a boiler of the desired capacity, each section comprising an inverted U-shaped section comprising the top chamber 1 and the vertical water legs 2 and 3, the chamber 1 having diagonal portions 4 and 5. Two sets of curved water tubes 6 and 7 are mounted in each section. The tubes may be curved all on the same radius throughout their length, or, as I have indicated in Fig. 1, they may be curved part of their length and straight the rest of their length. The upper ends of the set 6 are seated by expanding into suitable openings in the inclined wall 8 and the lower ends of the group of tubes 6 are expanded into openings in the wall 9 of the water leg 2. Suitable openings are formed in the outside walls to permit of such operation of introducing and expanding the tubes, and said openings are closed by cover plates 10 and 11.

The other bank of tubes is similarly mounted in the openings formed in walls 12 and 13 through openings in the outer walls corresponding thereto and closed by cover members 14 and 15.

The sections are manifolded together through suitable nipples introduced in the openings 16 at the top and openings 17 and 18 at the lower ends of the water legs 2 and 3.

These sections are provided with mounting pedestals or webs 19 and 20 by which they are supported from the floor.

The desired capacity of boiler may be built up by the use of the proper number of sections of the type shown in Fig. 1 and closed at the ends by either solid plates or water jacketed plates cooperating with the sections such as shown in Fig. 1.

I have indicated the burner of my invention at 21, this burner being of the type disclosed in my aforementioned co-pending application, the burner consisting of a bowl containing a thin layer of broken refractory into which air and fuel gas or oil are injected to maintain the broken refractory at a high degree of incandescence. A large proportion of the heat developed is developed in the form of radiant energy which strikes the walls and the lowermost tubes. The gases of combustion which are developed pass up through the banks of tubes 6 and 7 and pass out laterally through the end section, either through a straight opening or through a downwardly extending flue to trap the hot gases in the upper part of the boiler in contact with the tubes. The outlet opening is indicated at 22. It may lead directly to the stack or it may lead downwardly through a flue and out as indicated at 23.

Figure 2:
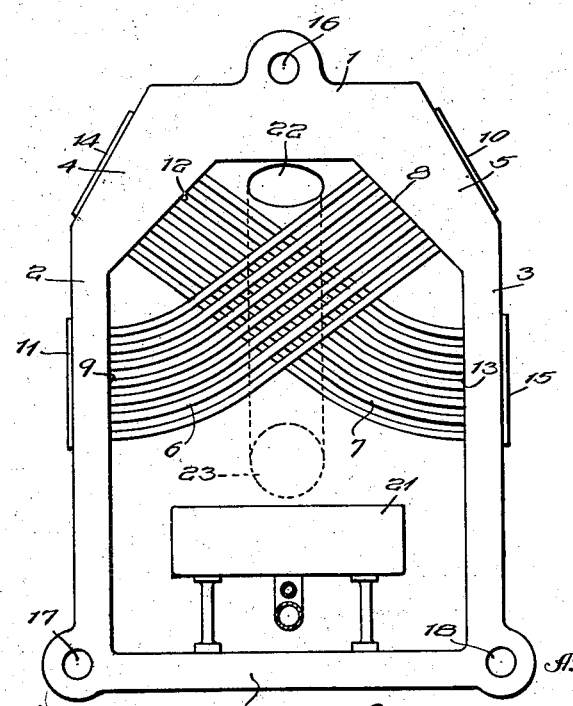
Fig. 2 is a like front elevational view of a modified form of the same.

In the modified form shown in Fig. 2 the water legs 2 and 3 are connected by a horizontal water leg connection 24 which thereby forms a complete water jacketed enclosure for the burner 21.

In these forms (Figs. 1 and 2) there is a complete double circulation. The incoming relatively cold water enters by way of the connections 17 and 18 and flows up in the water legs 2 and 3, entering the lower ends of the banks of tubes 6 and 7 and then, on being heated in said tubes, passes up by natural circulation into the diagonal portions 4 and 5 of the top chamber 1, steam or hot water being released in said chamber and passed out through the discharge opening 16 which forms a manifold for all of the sections.

The water which is not formed into steam or discharged as heated water at the opening 16 again passes down to the openings of the tubes of the other bank in the same water leg, the circulation of the water thus describing a figure 8 through the two banks of tubes of each section.

Where these two banks of tubes cross, there is a zone of very active heat absorption, due to the relatively large area within a given volume, and due also to the baffling effect of these tubes upon the flow of air current. That is to say, the heated gases in rising through the banks of tubes, tend to follow the tubes, but where these two sets of tubes cross, the flows being generally transverse to each other, set up local circulation or eddy currents, breaking up the film of gas adhering to the outside of the tubes and thereby securing a highly efficient transfer of heat from the gases to the tubes.

The crossed tubes shown in Figs. 1 and 2 are wrought metal tubes expanded into the cast frame, but the tubes may, if desired, be cast integral with the frame as shown, for example, in Figs. 4 and 5.

Here two banks of tubes for each section are shown as cast integral with the side walls of the section extending only between the water legs 2 and 3. Obviously, these tubes 26 and 27, instead of being straight, may be curved and their upper ends may enter a diagonal portion as shown at 4 and 5 in Fig. 1. These tubes may be diamond shaped in cross-section or they may be round or any other suitable shape, if desired.

In Fig. 5 I have shown parallel tubes extending transversely between the water legs 2 and 3, these tubes to have upward inclination from one water leg to the other, and being arranged to baffle the gases as they pass upwardly, that is, to throw them from a tube on one side upward and against the tube on the other side so as to secure a breaking up of the gas streams and thorough absorption of the heat of the gases. Alternate sections may be arranged with the tubes disposed on opposite inclinations so that the flow of the sections tends to be equalized. In Fig. 5 one row of diagonal tubes is shown at 28 and another row at 29 in the section 30.

The back section 31 is shown as comprising a row of tubes 32 and a corrugated water back 33 formed in the end wall of the boiler.

In Fig. 3 I have shown a modified form of section in which there is the usual upper chamber 1 connected to water legs 2 and 3 with diagonal tubes 36 and 37 connected to a common manifold 35 which leads up to the bottom of the chamber 1. This gives a circulation of the water to be heated from the chamber 1 down through the leg 3, up through the tubes 37 and through manifold 35 back to the chamber 1 on one side, and a like circulation on the other. The gases discharged by the burner 21 rise and tend to follow the tubes 36 and 37 to the central manifold 35, that is, to the central part of the boiler, but the outlet connection for the products of combustion comprises outlets 38 and 39 formed through the water legs 2 and 3 and communicating with the upper part of the inside of the section. The openings 38 and 39 may be formed partly in one section and partly in another, or may be formed entirely within the section. Sheet metal cover plates 40 and 41, in the form of shallow boxes, are fitted to the sides of the sections as by means of the flanges 42 extending around the edges of the plate 40, and the lower ends of these boxes thus formed are connected to the stack or chimney for taking away the gases of combustion. In this manner the gases from the burner 21 pass upward and tend to be driven inward by the inward slope of the tubes 36 and 37 and then, however, are compelled to pass outwardly through the openings 38 and 39 into the breeching boxes 40 and 41 and thence out through the stack.

The employment of the breeching boxes outside the boiler, as shown for example in Fig. 3, is highly advantageous. Thereby the outer surface of the boiler becomes active to absorb heat from the gases. The sheet metal boxes replace insulation with hot gas insulation. The bare metal walls of the breeching boxes radiate heat outwardly to the basement which is generally too cold.

The use of separate sheet metal boxes on the outside of the sections may be avoided by casting passageways within the sections themselves, as shown in the modification of Fig. 6. In this form, instead of leading the gases out through the passageways 38 and 39, as shown in Fig. 3, I provide downwardly extending passageways 44 and 45 cast within the sections. These vertical flues 44 and 45 terminate in horizontally extending flues 46 and 47 which are connected through the elbows 48 and 49 and condenser casing 50 to the flue or stack at 51.

The condenser box 50—50 comprises a transverse shell through which extend tubes 52, said tubes being connected to headers or manifold boxes 53 and 54 connecting the adjacent ends of the tubes 52 all in parallel, or by dividing a header, or headers, multipass operation of liquid may be secured. Suitable baffles, as shown at 55, may be interposed to cause the gases to take a longer path transverse to the tubes 52 in their passage to the stack at 51. An inlet water connection 56 is connected to the bottom of the manifold box 53 and an outlet connection 57 from the top of the manifold box 54. The inlet connection 56 preferably is fed from the return line, that is, the water returning from radiators where the working fluid has given off its heat. The connection 57 preferably leads to one of the connections 17—18 for the introduction of said water into the boiler. Obviously, instead of using the return water for chilling the gases and precipitating the water vapor in the condenser 58, water to be heated for domestic purposes may be employed or, in fact, any suitable fluid which has the ability to carry off the necessary heat and employ the same usefully, may be used.

The elbow members 48 and 49 have wells or pockets 59 for collecting the condensate, namely, the water which is taken out of the products of combustion by the chilling surface provided by the outside of the tubes 52. This condensate is then discharged through a trap 60 in pipe 61 to the sewer or other suitable point of discharge.

In the normal operation of a boiler of this character, when the same is started cold a considerable amount of moisture may be condensed by the boiler itself and I may therefore provide a drain comprising a pan or trough 62 disposed in the longitudinal passageways 46' and 47', as shown in the modification of Fig. 8. Here the longitudinal flue 47' is so formed that water running down the vertical flues 45 drips at the point 63 into the pan 62 from whence it is led into the well or pocket 59 and there onto the discharge connection 61.

Figure 10:
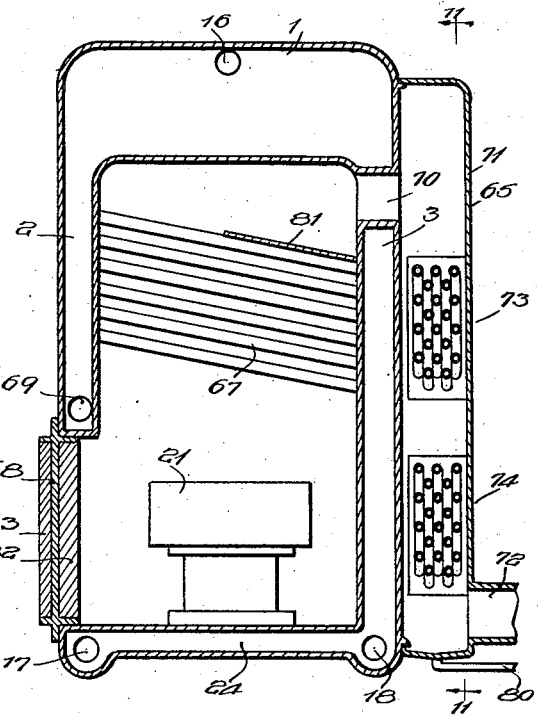
Fig. 10 is a transverse vertical section through a boiler embodying my invention, the section being taken on the line 10—10 of Fig. 11.
Figure 11:
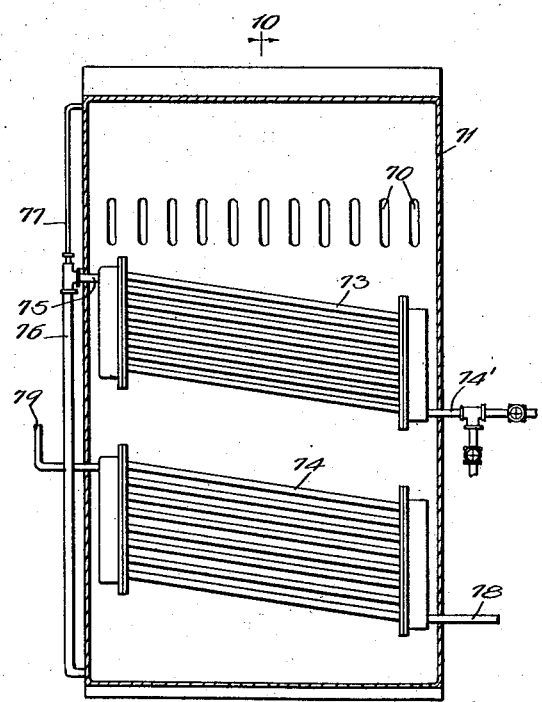
Fig. 11 is a vertical section on the line 11—11 of Fig. 10 showing the water vapor condensers in elevation.

In Figs. 10 and 11 I have shown a modified form of boiler in which two condensers are disposed in the breeching 65. The boiler may be made sectional, that is, of cast iron sections. In this case there is provided the upper chamber 1 and two vertically extending water legs 2 and 3 with the bank of tubes 67 therebetween, said tubes being inclined upwardly and toward the front. A door member 68 is provided to close the opening through which the burner 21 is inserted and may be inspected. Preferably this door makes a tight connection and the fire box is not open to atmosphere, all of the gas for the products of combustion being supplied to the burner 21. The lower ends of the water legs 2 may be manifolded together by nipples placed in openings 69 for those sections which define the door opening.

The rear legs 3 have flue openings 70 therethrough, opening into a breeching box 71, which breeching box has a gas outlet or flue 72 leading to the stack or chimney. Within the breeching box 71 there are disposed two condenser elements 73 and 74. The condenser element 73 comprises a plurality of tubes which may have fins thereupon for the more ready transfer of heat, with a water inlet 74' preferably from the return from the radiators, and an outlet 75 which leads downwardly by means of the pipe 76 to the manifold connections 17 or 18. At the top of the connection 76 there is a small pipe 77 leading to the manifold connection 16, so as to equalize pressures outside of the boiler section.

The lower condenser element 74 has a water inlet 78 and a water outlet 79. The water inlet 78 receives water from the city mains and the discharge connection 79 discharges the same to a gas heater for domestic use or the like. It will now be seen that the upper condenser 73 abstracts as much heat as is possible from the flue gases and returns them into the water circulation of the boiler. So much of the water vapor as can be condensed by the condenser 73 drips down to the bottom of the breeching box 71 where a drain 80 is provided.

The cold water coming in through the inlet 78 into the condenser 74 removes practically all of the water vapor that can thus be condensed.

The gases of combustion arising from the burner 21 pass through the banks of tubes 67 and then are thrown forward by the baffle 81 to strike the upper wall of the gas space within the section, then the gases pass out the opening 70 into the breeching box 71 and down through the condensers 73 and 74, giving up their moisture, and then they pass out through the flue 72 to the stack.

The inside wall of the fire door 68 is preferably lined with firebrick 82 and the outside is filled with asbestos 83.

Figure 12:
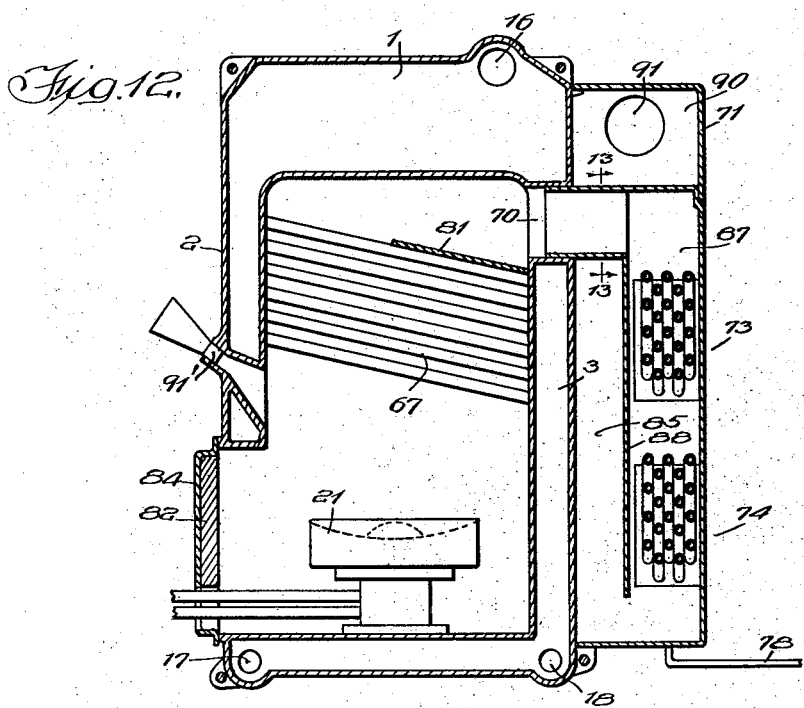
Fig. 12 is a vertical cross-section through a boiler of my invention showing a modified form of water vapor condenser and gas reheater.
Figure 13:
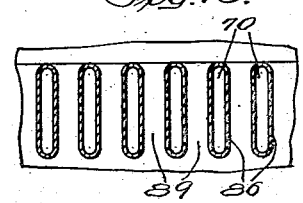
Fig. 13 is a fragmentary section taken on the line 13—13 of Fig. 12.

The boiler shown in Figs. 12 and 13 is similar to the boiler shown in Figs. 10 and 11. The door 84 is shown as having an inner lining only, although it is apparent that the outside of the boiler and the door may be insulated with magnesia insulation or the like.

In this form of the boiler, however, the products of combustion, after leaving the active zone of heat transfer in the boiler, pass through the condensers 73 and 74 and are then brought back and reheated so as to aid in a natural draft. In this case, a breeching box 71 is modified to include an additional upward passageway 85 between the condenser elements 73 and 74 and the back wall of the boiler. The back wall of the boiler has the flue openings 70—70 and into these flue openings short sheet metal tubes 86 are fitted so as to conduct the gases of combustion from the active space inside of the boiler to the downward passage 87 defined by the breeching box 71 on the outside and a plate 88 on the inside. This plate 88 extends down to a short distance above the bottom wall of the breeching box 71 to permit the gases of combustion, after passing through the passageway 87 in contact with the condenser elements 73 and 74, to pass up the pasageway 85 and then through the narrow passageways 89 between the short tubes 86 so as to abstract heat from the products of combustion as they are discharged from the inside of the boiler.

The gases then pass up into the chamber 90 and out the flue 91 to the stack.

An inspection opening 91' is provided in the front wall of the boiler, giving access through a narrow opening to visual inspection of the active surface of the burner 21. This opening may normally be plugged.

The products of combustion passing up from the burner 21 pass through the tubes 67 and then to the left of the baffle 81 out the flues 70 and to the pipes 86 into the downward passage 87 in the breeching box 71. Here the gases come into contact with the upper condenser 73, losing a part of their heat and being thereafter sufficiently chilled in contact with the condenser 74 to remove substantially all of the free water vapor which is drained down and out through the connection 78. From this the gases pass down under the bottom edge of the plate 88 up through the passageway 85 and between the tubes 86 into the box 90 and out the flue 91.

Figure 14:
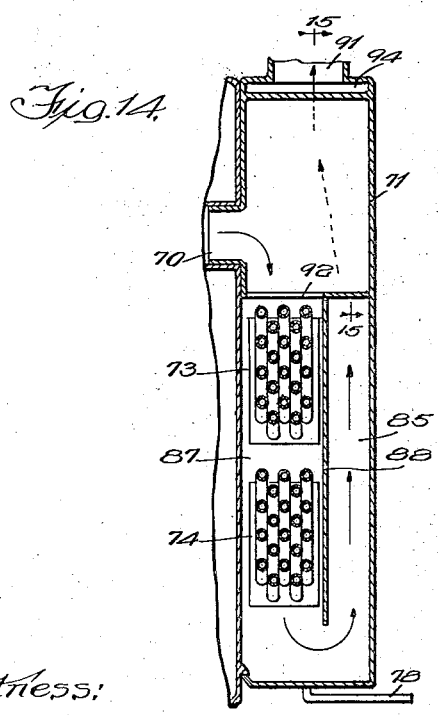
Fig. 14 is a fragmentary cross-section through a modified form of vapor condenser and gas reheater.
Figure 15:
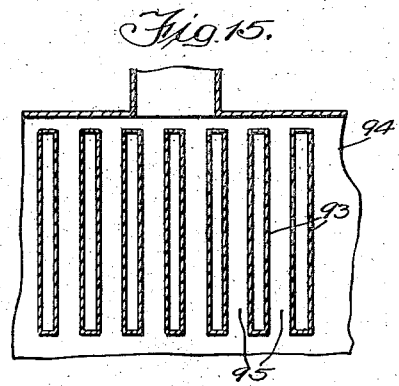
Fig. 15 is a section taken on the line 15—15 of Fig. 14.

In the modification of Figs. 14 and 15, the relative location of the two passageways 87 and 85 has been reversed. In this case the passageway 85 lies outside the condenser element 73—74, and the passageway 87 lies between the plate 88 and the back wall of the boiler. In this case the flue openings 70 open into narrow boxes having only the openings 92 at their bottoms communicating with the passageway 87. These narrow boxes are shown at 93 in Fig. 15 extending up in the inside of the breeching box to a point adjacent the flue opening 91. The openings 92 in the bottoms of these box elements 93 communicate with the passageways 87 so that the gases coming out of the flue openings 70 pass down through the narrow spaces defined by the walls of the boxes 93 down through the openings 92 through the passageway 87 which contains the condenser elements 73 and 74, then down below the plate 88 up through the passageway 85 and thence to the narrow spaces 95 between the narrow boxes or elements 93. From thence the gases pass on up through the stack 91.

In each case the gases, after they are chilled by the condensing surfaces to take out the water vapor, are again reheated to assist in the natural draft circulation and also to prevent further condensation of vapors.

In Fig. 16 I have shown a form of boiler in which the sections are similar to those shown in Figs. 3 and 6. In this case the sections have passageways 96 and 97 formed in the side walls thereof, and the entire boiler is provided with a sheet metal jacket 98 which is made substantially gas tight, and the flues 96 and 97 which lead from the upper outer part of the gas space lead the products of combustion down to the bottom part of the casing 98, as indicated at 99—99.

From thence the gases pass up through the condenser element 74—73 which are arranged with the colder condenser element more remote in the gas travel, and consisting of tubes extending along the side walls of the boiler and housed in the jacket 98. Connections 78—78 lead the condensate to the sewer. The gases, after they pass down through the flues 96—97 come into contact with the condenser elements 73 and 74 and thence pass up into the space 100—100 above the boiler section to the flue 91 communicating with the chimney or stack.

Obviously, instead of having two condensers, that is, condensers of two different characters, the condenser tubes may all be connected to the return line or they may all be connected to cold incoming water connections for heating domestic water. In either event, the water vapor is sufficiently taken out that the remaining quantity is not detrimental in the products of combustion.

The condenser element may be built in a part of the boiler itself, as shown in Figs. 17 and 18. In this case, the last two sections 101 and 102 are formed to provide a passageway 103 between them, the surfaces defining this passageway having a large number of fins or pins 104 projecting from the surface so as to form efficient heat receiving elements.

In this case the incoming cold water connection is shown at 105, the incoming water passing down through the section 102 around the flue outlet 106 through the connecting passageway 107 to the adjacent section 101, or to other sections, and then passing up through the section 101 into the general circulation. The products of combustion which have passed through the tubes 108 must pass down through the flue 103.

The gases pass up through the tubes 108 out through the passageway 101 down through the flue 103 in contact with the pins or projections 104, where the water vapor is condensed out, then out through the opening 106 into the space between the jacket 109 and the end of the boiler. From here the gases pass up to the top space 110 and then spread and go down the sides along the spaces 111 to the breeching connections 112 at each side and from thence to the stack.

I do not intend to be limited to the details shown or described.

I claim:—

1. In a system of the class described, a boiler having a flue for products of combustion, a member disposed in the fluid and having a chilling surface for precipitating by condensation the water vapors contained in said products of combustion, a fluid conduit in contact with said chilling member for carrying off the heat imparted to said member by said water vapors, and means for raising the temperature of said products of combustion after they contact with said chilling surface by heat derived from the products of combustion prior to chilling thereof.

2. In combination with a boiler for burning of fuels rich in hydrogen, a gas outlet passageway, a flue connection, and a conduit between said gas passageway and said flue connection, a condenser disposed in said conduit, said conduit having two parts thereof in thermal contact to provide for transfer of heat from the gases as they pass from the boiler to the condenser and to the gases as they pass from the condenser to the stack.

3. The method of conducting products of combustion from a boiler to a flue which consists in cooling the hot gases from the boiler below the temperature of condensation to condense the water vapors contained in said products of combustion, and then reheating the cooled gases by heat derived from the hot gases prior to cooling thereof to improve the draft through the flue and to prevent further condensation within the boiler.

4. In a system of the class described, a boiler, a flue, means between the boiler and the flue for reducing the temperature of the products of combustion from the boiler to below the condensation point to condense the water vapors therein, and means between said last means and the flue for reheating the gases before they enter the flue by heat derived from the hot gases prior to cooling thereof to prevent further condensation within the boiler.

5. In combination, a boiler having a combustion space, a breeching box adjacent the boiler and having a downflow passage and an upflow passage, a conduit connecting the combustion space of the boiler to the downflow passage, means in the downflow passage for cooling the products of combustion flowing therethrough, and a flue communicating with the upflow passage, said conduit being disposed in the path of the gases flowing through the upflow passage and to the flue.

6. In combination, a boiler having a combustion space, a breeching box adjacent the boiler and having a downflow passage and an upflow passage, a plurality of conduits of relatively small cross-area located in the upflow passage and connecting the combustion space of the boiler to the downflow passage at the upper end thereof, means in the downflow passage for cooling the products of combustion flowing therethrough, and a flue communicating with the upflow passage above said conduits.

7. In combination, a boiler having a combustion space, a breeching box adjacent the boiler and having a downflow passage and an upflow passage, a plurality of conduits of relatively small cross-areas located in the upflow passage and connecting the combustion space of the boiler to the downflow passage at the upper end thereof, said conduits being of approximately rectangular shape in cross-section and comparatively narrow relative to their height, means in the downflow passage for cooling the products of combustion flowing therethrough, and a flue communicating with the upflow passage above said conduits.

8. In a system of the class described, a boiler having a flue for products of combustion, a member disposed in the fluid and having a chilling surface for precipitating by condensation the water vapors contained in said products of combustion, and means for raising the temperature of said products of combustion after they contact with said chilling surface and by heat derived from the products of combustion prior to chilling thereof.

9. In combination, a boiler assembly having a combustion space and a downflow passage and an upflow passage, conduits connecting the combustion space to the downflow passage, means in the downflow passage for cooling the products of combustion flowing therethrough, and a flue communicating with the upflow passage, said conduits projecting into the upflow passage.

10. In combination, a boiler assembly having a combustion space and an inner downflow passage and an outer upflow passage, conduits connecting the combustion space to the downflow passage and extending into the upflow passage, means in the downflow passage for cooling the products of combustion flowing therethrough, and a flue communicating with the upflow passage.

11. In combination, a boiler having a combustion space, a casing enclosing the sides and the top of the boiler and spaced therefrom, said boiler having downflow passages communicating with the combustion space and with the casing remote from the top thereof, a flue communicating with the upper portion of the casing, and means at the sides of the boiler and disposed between the latter and the casing for chilling the products of combustion flowing to the flue.

In witness whereof, I hereunto subscribe my name this 22nd day of December, 1927.

ASHUR U. WETHERBEE.